US008611339B2

(12) United States Patent
Jana et al.

(10) Patent No.: US 8,611,339 B2
(45) Date of Patent: Dec. 17, 2013

(54) APPARATUS AND METHOD FOR PROVIDING PRESENCE

(75) Inventors: Rittwik Jana, Parsippany, NJ (US); John Murray, Denville, NJ (US); Christopher Rice, Parsippany, NJ (US); Ron Shacham, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 253 days.

(21) Appl. No.: 12/575,732

(22) Filed: Oct. 8, 2009

(65) Prior Publication Data

US 2011/0085654 A1    Apr. 14, 2011

(51) Int. Cl.
*H04L 12/66* (2006.01)
*H04L 12/16* (2006.01)
*H04L 12/28* (2006.01)
*H04Q 11/00* (2006.01)

(52) U.S. Cl.
USPC ........... 370/352; 370/260; 370/270; 370/390; 370/401; 370/410

(58) Field of Classification Search
None
See application file for complete search history.

(56) References Cited

U.S. PATENT DOCUMENTS 7,975,037 B2 *   7/2011   Tai et al. ....................... 709/223

OTHER PUBLICATIONS

Von Olaf Bergmann, A Framework for Aggregation of Presence Information Based on User-Provisioned Rules, Vorgelegt im Fachbereich 3 der Universitat Bremen, Nov. 2006.

Eran Belinsky et al., Pasta; Deriving Rich Presence for Converged Telecommunications, Network Applications, IEEE, 2007.
Chentouf et al., "Presence Interaction Management in SIP SOHO Architecture", E. Najm et al., (Eds.): FORTE 2006, LNCS 4229, pp. 93-98, 2006. IFIP International Federation for Information Processing 2006.
Mohammad N. Vakil, "The Enhanced Presence Model", Microsoft Office Communicator 2007, Microsoft Corporation published Sep. 2007, pp. 1-31.
Ron Shacham et al., "Composition for Enhanced SIP Presence", 12th IEEE Symposium on Computers and Communications, Jul. 1-4, 2007, 9 pages.

* cited by examiner

*Primary Examiner* — Faruk Hamza
*Assistant Examiner* — Diane Lo
(74) *Attorney, Agent, or Firm* — Guntin & Gust, PLC; Andrew Gust

(57) ABSTRACT

A system that incorporates teachings of the present disclosure may include, for example, a server having a controller to receive presence information from each presence source of a plurality of presence sources, wherein the presence information is associated with a user, receive a Session Initiation Protocol (SIP) Uniform Resource Identifier (URI) which identifies the user, wherein identification information associated with the user from each presence source is mapped to the SIP URI, select at least a portion of the received presence information to be utilized in determining a presence status of the user, determine the presence status of the user based on the selected presence information, and transmit the presence status and the SIP URI to a computing device operably coupled to an Internet Protocol Multimedia Subsystem (IMS) network. Other embodiments are disclosed.

17 Claims, 9 Drawing Sheets

600

700

APPARATUS AND METHOD FOR PROVIDING PRESENCE

FIELD OF THE DISCLOSURE

The present disclosure relates generally to presence information and more specifically to an apparatus and method for providing presence information.

BACKGROUND

Presence information can provide users with information pertaining to the status of other users. Typically, presence information can include useful information such as the availability of a user, the willingness of a user to communicate, a user's preferred means of communication, and a user's location and activity information. In many current networks, such as Voice over Internet Protocol (VOIP) and instant messaging (IM) networks, a user's presence information is based on a single application and is usually manually set by the user. A user often has multiple identities that uniquely identify the user within a particular system. Gathering presence information from a plurality of different sources can further provide information regarding the user's status.

DETAILED DESCRIPTION

One embodiment of the present disclosure can entail a server having a controller to receive presence information from each presence source of a plurality of presence sources, wherein the presence information is associated with a user, receive a Session Initiation Protocol (SIP) Uniform Resource Identifier (URI) which identifies the user, wherein identification information associated with the user from each presence source is mapped to the SIP URI, select at least a portion of the received presence information to be utilized in determining a presence status of the user, determine the presence status of the user based on the selected presence information, and transmit the presence status and the SIP URI to a computing device operably coupled to an Internet Protocol Multimedia Subsystem (IMS) network.

Another embodiment of the present disclosure can entail a method including subscribing to presence information associated with a presentity, and receiving a SIP notification message indicating a presence status of the presentity from a presence server operating in an IMS network, wherein the presence status is determined by a computing device in communication with the presence server, wherein the presence status is determined by the computing device by selectively aggregating presence data received from each presence source of a plurality of presence sources, wherein identification information associated with the presentity from each of the plurality of presence sources is mapped to a SIP URI, and wherein the IMS network identifies the presentity based on the SIP URI.

Yet another embodiment of the present disclosure can entail a computer-readable storage medium having computer instructions to receive aggregated presence information associated with a user from a computing device, wherein the aggregated presence information is aggregated by the computing device by selecting presence data from a plurality of presence data received from a plurality of presence sources, receive an identifier from the computing device, wherein the identifier is mapped by the computing device to identification information from each presence source of the plurality of presence sources, wherein the identification information is associated with the user; and transmit the identifier and the aggregated presence information to a server operably coupled to an IMS network.

Figure 1:
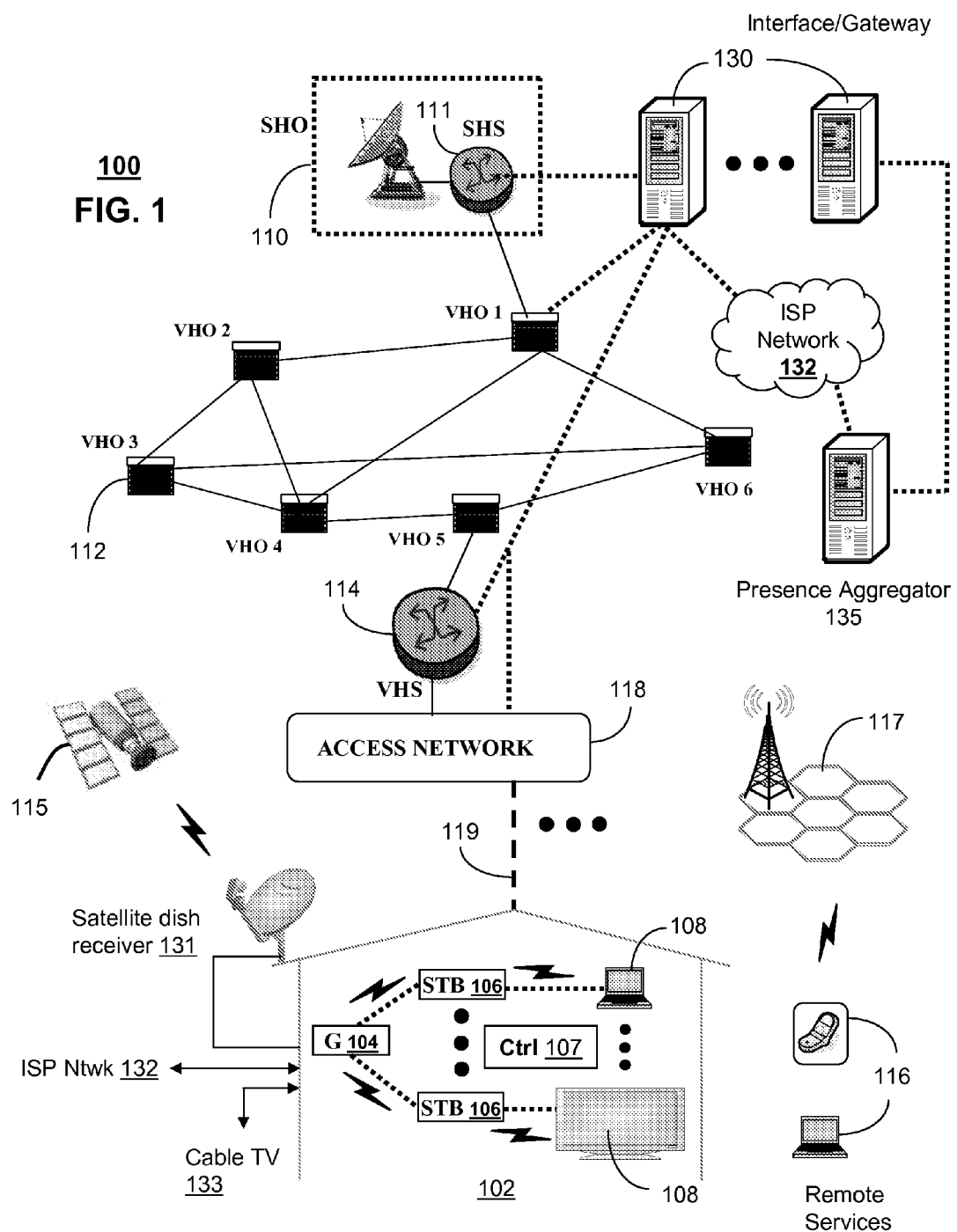
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

The first communication system 100 can also include a presence aggregator 135. The presence aggregator 135 can be a server, processor, or other similar device capable of performing processing operations. The presence aggregator 135 can be configured to be operably coupled to ISP network 132 and to any of the devices in the system 100. Additionally, the presence aggregator 135 can be configured to receive presence information, identity information, messages, and other information associated with a user from the various devices in the system 100. Once the presence aggregator 135 receives the relevant presence information and other information, the presence aggregator 135 can be configured to resolve conflicts regarding the presence information, determine aging information associated with the presence information, create inferences regarding the presence information, and other similar functions. The presence aggregator 135 can also prioritize certain presence information over other presence information to so as to intelligently provide a presence status for a user.

Another distinct portion of the computing devices 130 can function as a interface/gateway (herein referred to as gateway 130). The gateway 130 can use common computing and communication technology to perform the function of receiving presence information and other information from the presence aggregator 135. Additionally, the gateway 130 can serve as an interface between the system 100 and an IMS network, such as found in system 200, which is described in further detail below. The gateway 130 can also serve as a publisher and receiver of presence information. As an IMS publisher, the gateway 130 can receive a stream of presence information from the presence aggregator 135, which can represent an overall presence status of a particular user. As a receiver of presence information, the gateway 130 can also be configured to transmit presence information received from presence sources from within the IMS network to the presence aggregator 135.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
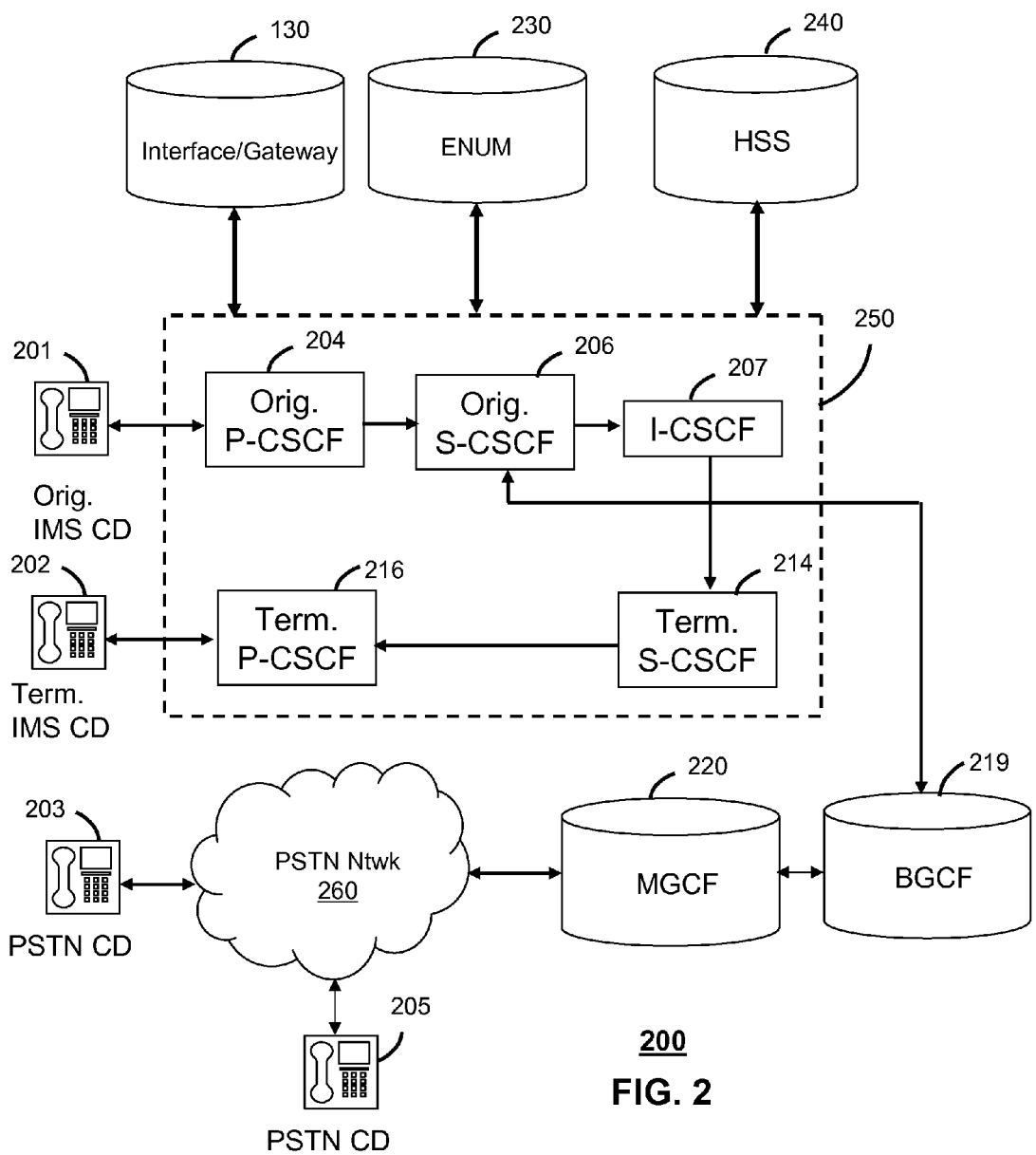

FIG. 2 depicts an illustrative embodiment of a communication system 200. employing an IMS network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a SIP INVITE message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The gateway 130 and the presence aggregator 135 of FIG. 1 can be operably coupled to the second communication system 200 for purposes similar to those described above.

Figure 3:
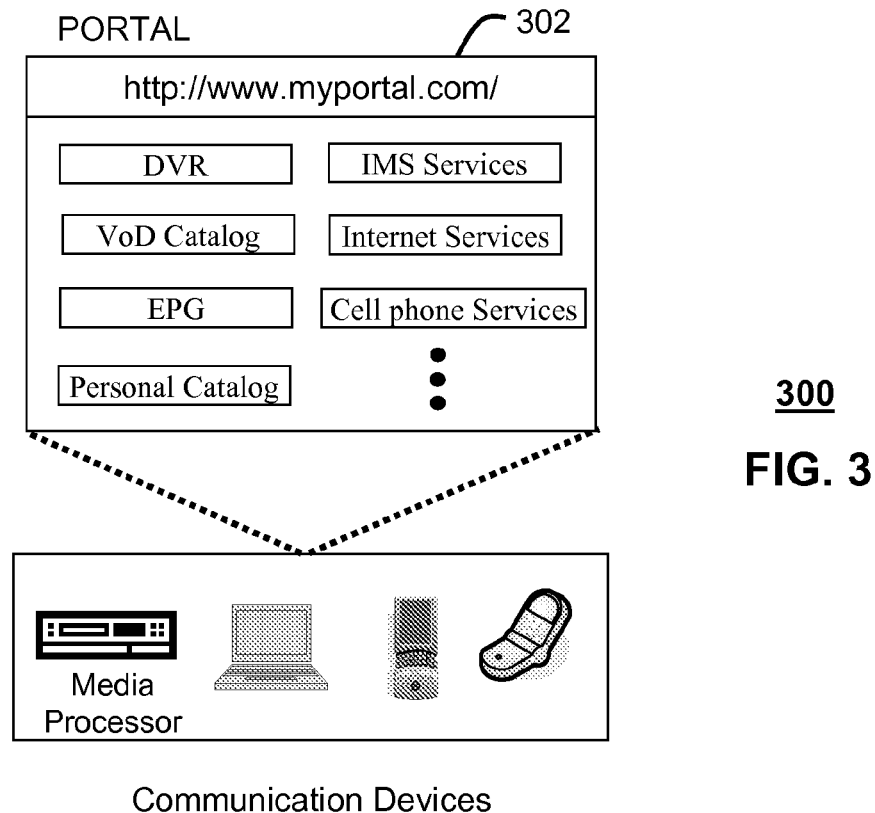
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
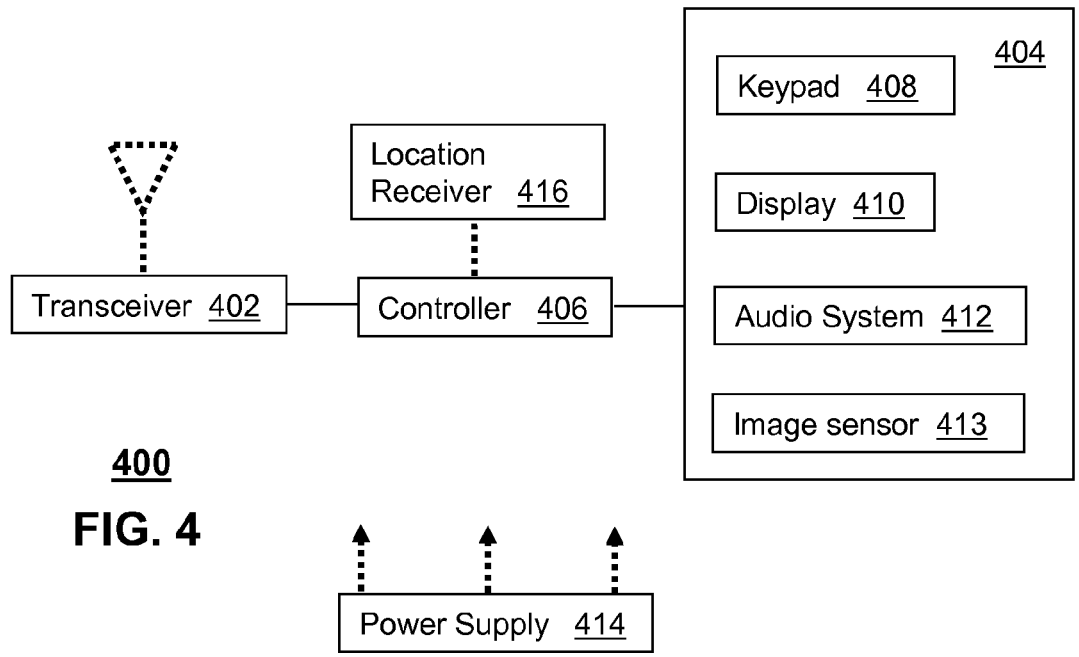
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
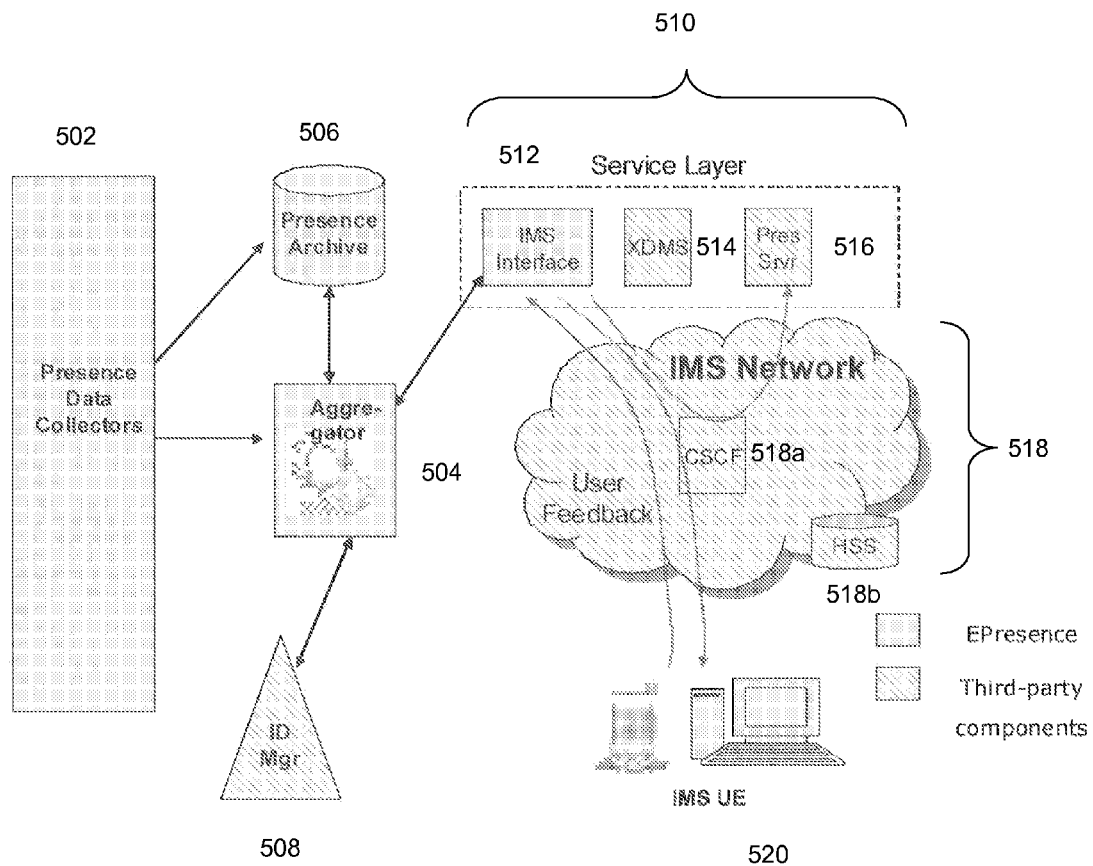
FIG. 5 depicts an illustrative embodiment of a system for providing presence information, which can operate in portions of the communications systems of FIGS. 1-2.

FIG. 5 depicts an illustrative embodiment of a system 500 for providing presence information, the system operable in portions of the communication systems of FIGS. 1-2. The system 500 can include one or more presence data collectors 502, which can be servers, computing devices, or other similar devices. The presence data collectors 502 can be configured to receive presence information from a plurality of presence sources, wherein the presence information can be associated with a particular user/presentity being tracked and/or subscribed to. The user/presentity can include, but is not limited to including, a person, a computing device, an application, or anything else for which presence information can be gathered. For example, the user/presentity can be a printer, fax machine, or other computing device. The presence information can be gathered using various protocols such as Simple Network Management Protocol (SNMP), Simple Object Access Protocol (SOAP) based web services, log files, or through other means.

Notably, the presence information itself can include information that identifies that a user has logged in and/or logged out of a computing device, network, and/or application, such as an instant messaging (IM) application. Additionally, presence information can include information associated with a stored event that a user has on a calendar, an email transmission associated with the user, an answered phone call, an unanswered call, a hung up phone call, contact information, media content associated with the user, information pertaining to the availability and location of the user, and other presence information. The presence sources can include telephones, mobile devices, personal computers, IM clients, email clients, calendars, networks, and other sources capable of conveying presence information to the presence collectors 502. Network flow data that is generated as a result of the user's/presentity's activity can also be a presence source. For example, if the user makes a call which results in a call detail record, that can act as a presence source. As another example, if the user is visiting a web page from a mobile device and is logged into a server, this can also serve as a presence source.

Once the presence information is received by the presence collectors 502, the presence collectors 502 can transmit the presence information as a stream of messages, which can represent relevant information obtained from the presence sources. The presence information can be streamed to a presence aggregator 504, which can be a server or other similar computing device, and/or to a presence archive 506, which can be a database or other storage facility capable of storing the presence information. The system 500 can also include an identification manager 508, which can be configured to keep track of various identities associated with the presence information and map each one to the appropriate user. The identification manager 508 can be operably coupled to the presence aggregator 504 and to the other devices in the system 500.

Each user being tracked can have multiple identities/identification information associated with different devices, applications, and other presence sources that can be used to identify the user in the system 500. The identities/identification information that can identify the user can include, for example, a media access control (MAC) address, an IP address, a user identification (ID) associated with a calendar system, a social security number, an internet protocol address, a telephone number, an instant messaging (IM) user ID, a user ID associated with a software application, a serial number, and other identifying information.

The identification manager 508 can provide a virtual directory, which can map the above described identities/identification information to a single principal identity such as a SIP URI or other similar identifier. Once mapped, the identification manager 508 can relay the SIP URI and its associated mappings to the presence aggregator 504 and/or to other devices in the system 500. Other devices in the system 500 can also be configured to provided the operative functions of the identification manager 508. Additionally, the mapping of the identities/identification information to the SIP URI can be performed by the sources providing the identities/identification information. As the presence information is streamed to the presence aggregator 504, the presence aggregator 504 can be configured to analyze the presence information and determine which presence information is to be utilized in determining a presence status of a user associated with the presence information and the principal identity. The presence aggregator 504 can aggregate the presence information that is to be utilized in determining the presence status.

Notably, the presence aggregator 504 can be configured to resolve conflicts between different sets of presence information, determine aging information associated with the presence information, generate inferences regarding the presence data, and perform other similar functions. As an example, if a particular set of presence information indicates that the user has a meeting scheduled on his calendar at 12 p.m. in a particular conference room, but the user picks up his phone in his office at noon, the presence aggregator 504 can determine that the user is not actually in the conference room even though the calendar indicated that he would be. Additionally, the presence aggregator 504 can determine from prior history that certain sources provide a better indication of status than others. The presence aggregator 504 can also be configured to assign a greater weight to presence information coming from a particular presence source as opposed to another presence source. The presence status of the user can also be adjusted based on the greater weight assigned to certain presence information.

Once the presence aggregator 506 aggregates the presence information, the presence information and the principal identity can be transmitted to a service layer 510 or other similar layer, and specifically to a gateway, which can be an IMS interface 512. The service layer 508 can include the IMS interface 512, an XML document management server (XDMS) 514, and a presence server 516, however, it is not limited to having such components. The IMS interface 512 can serve as an interface between the presence aggregation components/platform of the system 500 and an IMS network 518.

The IMS interface 512 can be configured to both publish presence information into the IMS network 518 and/or receive presence information from devices in the IMS network 518. The IMS network 518 can include, but is not limited to including, a CSCF 518*a* and a HSS 518*b*. As an IMS publisher, the IMS interface 512 can be configured to receive the aggregated presence information, which can represent the user's overall presence, from the presence aggregator 504. The IMS interface 512 can convert the presence information into Presence Information Data Format (PIDF) with extensions such as RPID and can send the converted presence information into the IMS network 518. As a presence collector, the IMS interface 512 can be configured to receive presence information from the devices in the IMS network 518 or devices operably coupled to the IMS network 518. The IMS interface 512 can then forward the received presence information to the presence aggregator 504 for aggregation.

Additionally, IMS User Equipment (UE) 520 can be operably coupled to the IMS network 518. The IMS UE 520 can be a personal computer, server, mobile device, or other device. The IMS UE 520 can include a presence client, which can be associated with the user being tracked/subscribed to or with a user/watcher who is subscribing to the presence status of the user for whom the presence information is being gathered. The user/watcher can be another user, an application monitoring the presence status of the user, and/or a computing device configure to monitor the presence status of the user. The user/watcher utilizing the IMS UE 520 can login to the presence client and receive the presence status of the user subscribed to via the presence server 516. A SIP notification message indicating the presence status can be received by the user using the IMS UE 520 from the devices in the system 500. Notably, the presence status of the user can be determined by the presence aggregator 504 or the presence server 516 based on the aggregated presence information. The presence status can indicate, but is not limited to indicating, that a user is unavailable, in a meeting, available, that the user will be available at a certain time, or anything else capable of indicating the availability and/or location of the user.

In an embodiment, the devices of the system 500 can be configured to receive feedback from the user for whom the presence status is being determined. The presence server 516 and/or the presence aggregator 504, for example, can be configured update the presence status of the user based on the feedback received from the user. Also, the presence server 516 and/or the presence aggregator 504 can be configured to use this feedback to make decisions about presence in the future. For example, if a user has consistently indicated that the presence information indicated by a specific presence source is wrong, the presence source may be given a lower weight in the future. The user can confirm the presence status, indicate that the presence status is incorrect, add or remove presence information, and/or modify the presence status. The user can update his/her presence status/information via the presence client or through other means.

Additionally, other users can update the presence status for the user whose presence status is being tracked. For example, if a person receives a presence status of a user indicating that the user is in a meeting, but the person actually sees the person in his office, the person can update the presence status of the user via the presence client or through other means. Much like as described above, the presence server 516 and/or the presence aggregator 504 can be configured to use the feedback generated by other users to make decisions about presence in the future. In another embodiment, the devices in the system 500 can request and/or prompt the user, such as by sending a SIP notification message to the user, to provide feedback regarding the user's presence status. As an illustration, if there is a conflict between presence information, the user can be prompted to select the appropriate status.

Figure 6:
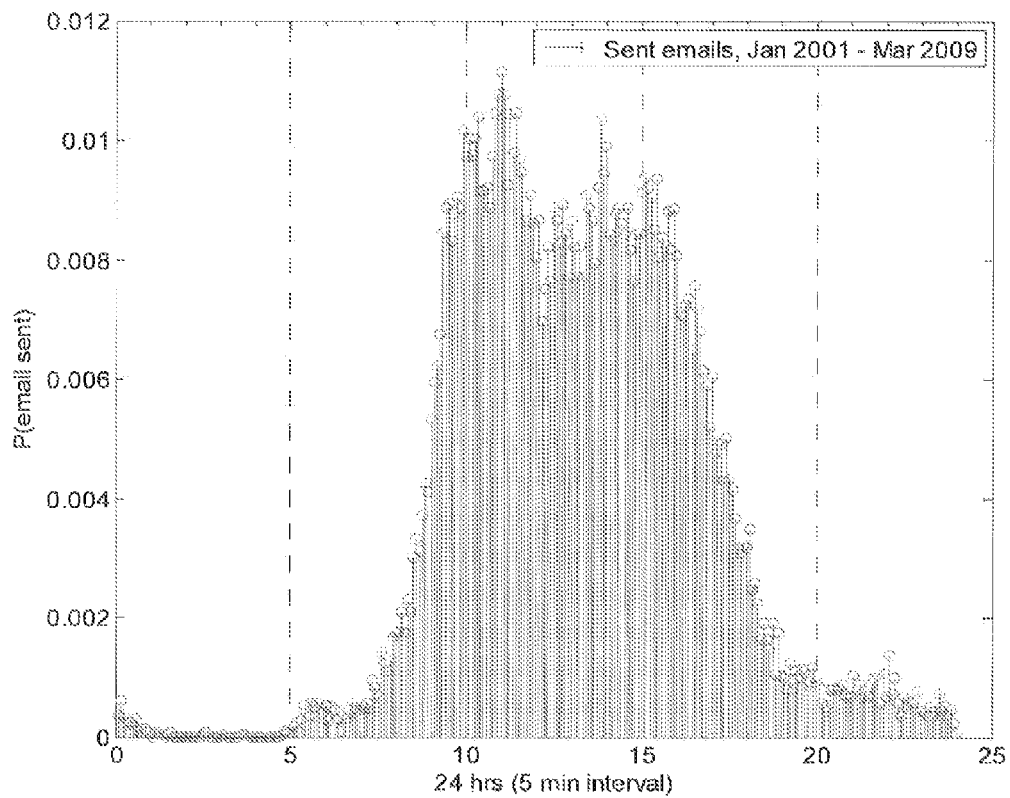
FIG. 6 depicts a probability distribution of sent email activity.

Referring now also to FIG. 6, a probability distribution of sent email activity is shown. The probability distribution provides a measure of the added utility provided by aggregation of the presence information. Email traces were collected for nine users for a period spanning eight years. The distribution illustrates that a majority of email activity occurs between 9

Figure 7:
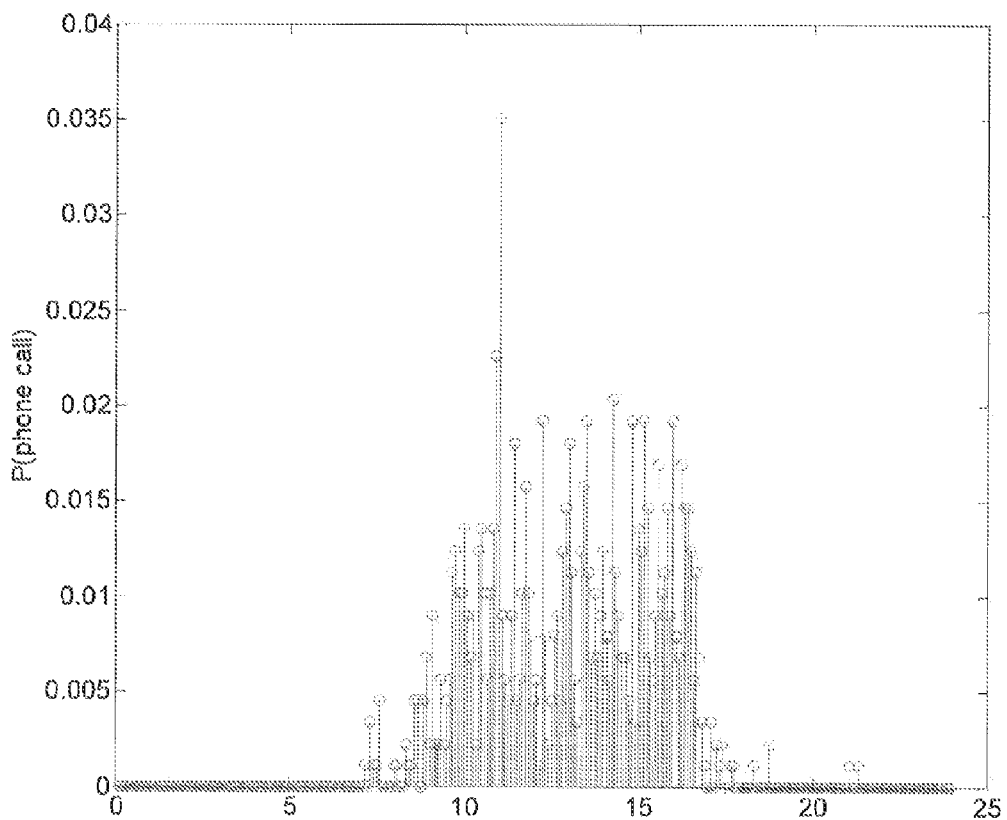
FIG. 7 depicts a probability distribution for private branch exchange (PBX) activity.

AM and 5 PM. As shown, there is a drop in email activity at midday presumably because people are at lunch and a slight increase in activity after 8 PM. Referring now also to FIG. 7, a probability distribution for PBX activity is shown. Much like FIG. 6, FIG. 7 also provides a measure of the added utility provided by aggregating presence information. The distribution illustrates a profile for PBX on-call/off-call activity taken over a one month period.

For presence sources that are relatively independent, the probability of the user activity in any of the sources increases as the number of sources increases. This aggregate probability of activity can be shown as follows:

$$P_{aggr\_activity} = 1 - \left[\left(1 - \int p_1\right) + \ldots + \left(1 - \int p_N\right)\right]$$
$$= p_1 + p_2 + \ldots p_N + \prod_{i=1}^{N} \left| p_i - \sum_{i,j=1}^{N} p_i p_j \right|$$

$P_i$ can represent the probability of activity in a particular source. One can then compute the likelihood of such activities for two such sources, email and PBX between 9 AM and 10 AM. The individual probabilities are P(email)=0.01 and P(PBX)=0.0125 respectively, while the combined probability should be around 0.0225, provided that they are more or less independent. The probability distributions are obtained by averaging over all users in the trace. If the probabilities are small, as a first degree approximation, the sum of the individual source probabilities constitutes the aggregate probability. Adding more sources allows one to cover the user's activity during more of the time.

Figure 8:
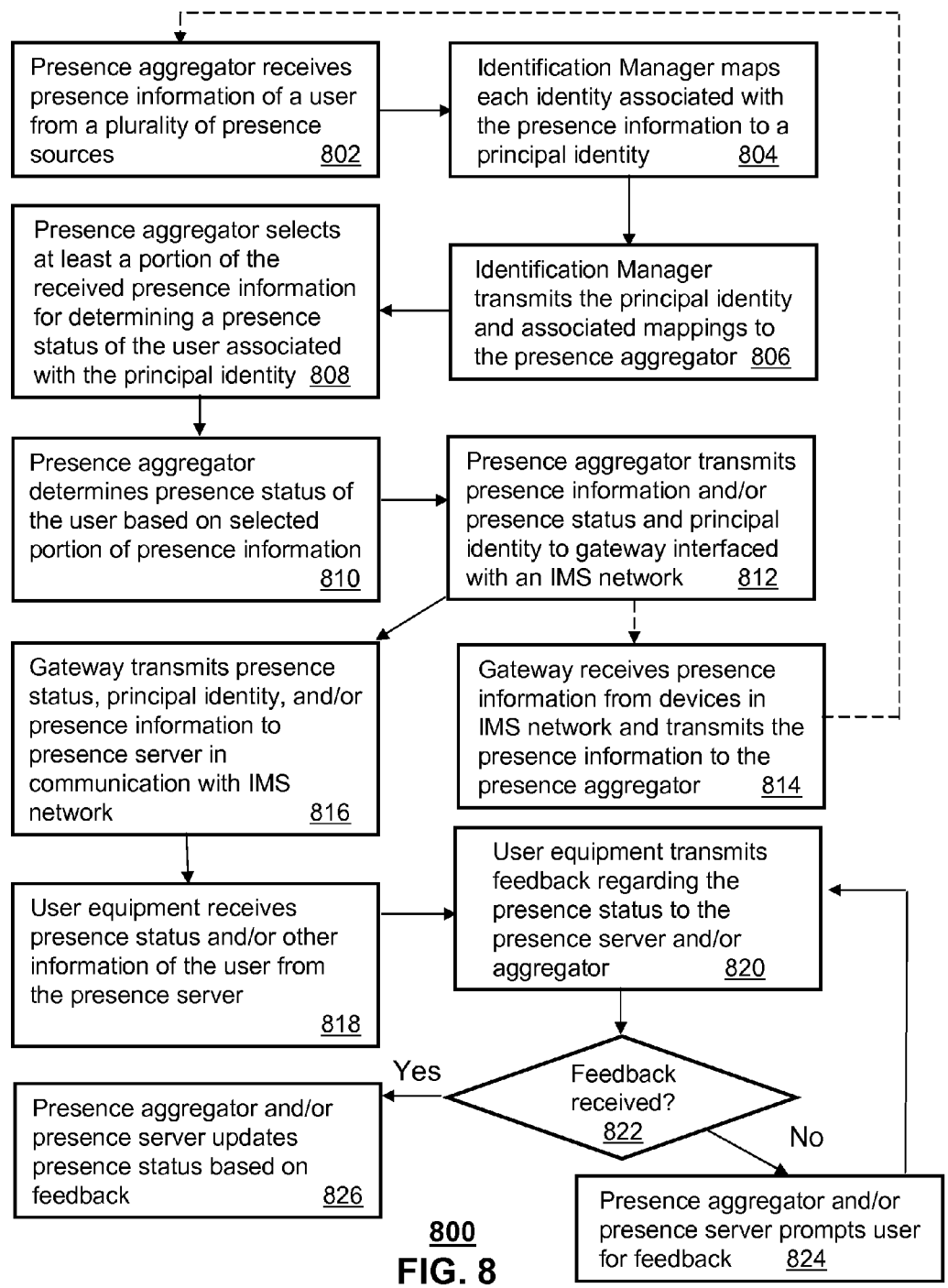
FIG. 8 depicts an illustrative embodiment of a method operating in portions of the communication systems of FIGS. 1-2.

FIG. 8 depicts an illustrative method 800 for providing presence information that operates in portions of the communication systems of FIGS. 1-2 and FIG. 5. Method 800 can begin with step 802 in which a presence aggregator, such as presence aggregator 504 can receive presence information from a plurality of presence sources. The presence aggregator 504 can be configured to receive the presence information from an intermediary, such as through presence collectors 502. At step 804, an identification manager, such as identification manager 508, can be configured to keep track of various identities associated with the presence information and map each identity to the proper user. As noted above, the identities of a user can include a MAC address, an IP address, user IDs, social security numbers, and other identifying information. The identification manager can provide a virtual directory, which can be utilized to map a user's identities to a single principal identity such as a SIP URI or other similar identifier. Once mapped, the identification manager can transmit the SIP URI and its associated mappings to the presence aggregator at step 806.

At step 808, the presence aggregator can be configured to select and aggregate at least a portion of the received presence information, which can be utilized in determining a presence status of a user associated with the presence information and the principal identity. The presence aggregator can determine the presence status of the user based on the selected portion of presence information at step 810. Other devices such as a presence server can also be utilized to determine the presence status. At step 812, the presence status, the SIP URI, and/or the presence information can be transmitted to a gateway, such as IMS interface 512. The gateway can serve as an interface between the presence aggregation components/platform and an IMS network, such as IMS network 518, which can identify a user based on the SIP URI. Additionally, in an embodiment, the gateway can receive presence information from devices in the IMS network and relay the presence information to the presence aggregator for aggregation at step 814. At step 816, the gateway can transmit the presence status, the SIP URI, and/or presence information received from the presence aggregator to a presence server, which can maintain a user's presence status.

At step 818, a user can utilize user equipment, such as IMS UE 520, to receive the presence status of a subscribed to user/presentity from the presence server. The presence status and/or other information about a user can be received from the presence server through a SIP notification message. The presentity user or another user can then provide feedback to validate, reject, or modify the presence status at step 820. The presence aggregator, presence server, and/or other devices can then determine if the feedback was received from the user at step 822. If not, the presence aggregator, presence server, or another device can prompt the user to provide feedback at step 824. The presence aggregator, presence server, and/or other devices can receive this feedback and update the presence status of the user based on the feedback at step 826. The method 800 can also include the operative functions of the system 500 as described above and below.

Upon reviewing the aforementioned embodiments, it would be evident to an artisan with ordinary skill in the art that said embodiments can be modified, reduced, or enhanced without departing from the scope and spirit of the claims described below. For example, as mentioned above, one of the sources for providing presence information can be a user's calendar. In one embodiment, the devices in the system 500 can be configured to access a user's calendar, and the presence aggregator 504 and/or another device in the system 500 can determine the user's status, such as if the user is in a meeting. However, often times a user's calendar can include recurring events, which are no longer attended or were never attended. Additionally, a user will often allocate more or less time to a calendared event than the user actually spends at the event.

The presence aggregator 504 can correlate events on the user's calendar with presence information received from other presence sources, such as call records, email logs, virtual private network (VPN) clients, and IM clients. By observing the pattern of these sources during the period of supposed calendar attendance, the presence aggregator 504 or other suitable device of the system 500 can determine that the calendared event is consistently unattended, in which case the event can be removed from the user's calendar. Under another scenario, the event can be regularly attended, however, the user can be interrupted during the event. In which case, the presence status can be updated to indicate that the user can be interrupted at that event.

Figure 9:
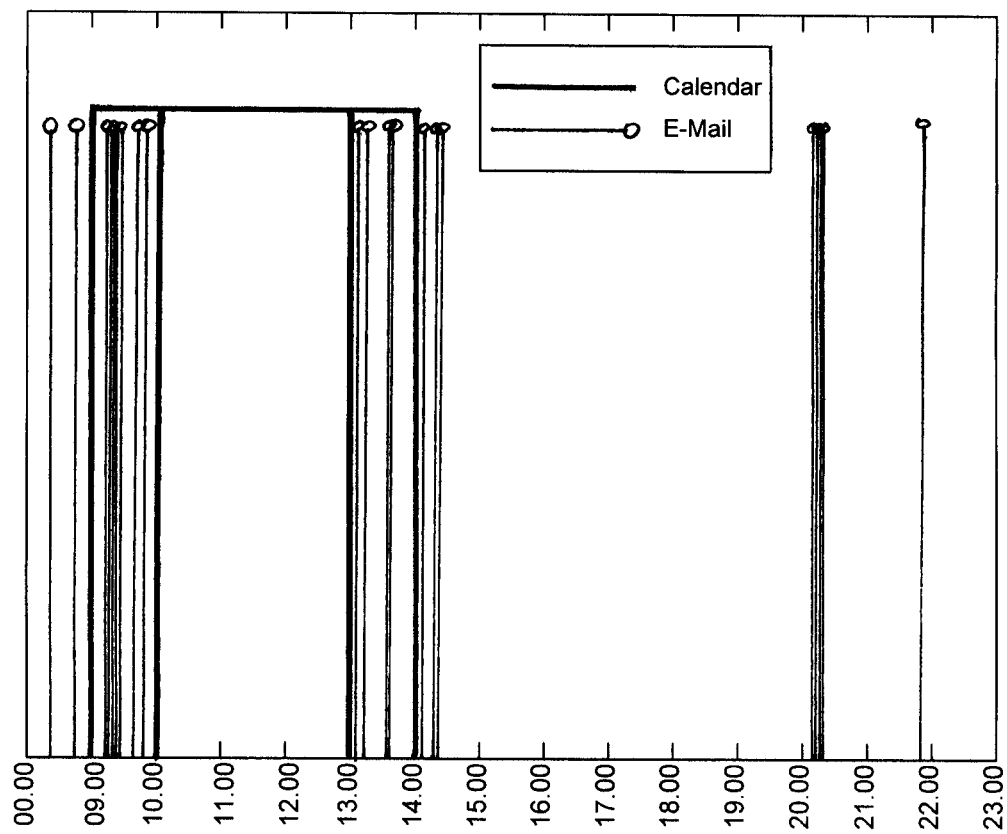
FIG. 9 depicts activity data for a user in a study.

Referring now also to FIG. 9, a study depicting user activity data is shown. As described above, calendar events can be a powerful source to be included in a user's aggregated presence. However, a calendar entry may be incorrect, often repeatedly, and, probably does not provide a good understanding of the user's business. FIG. 9 provides an example of associating a calendar source with another source, such as email, to understand the context of a calendar entry. The plot in FIG. 9 shows a day of activity for one user in a study. The user has three calendar entries, all delineated by a rectangle in the appropriate slot. Superimposed on this plot is a plot of the user's email activity with an impulse denoting an instance email activity instance, either reading or sending a message. During the first and third meetings, the user is continually interacting with email. However, during the second meeting from 10:00 AM to 1:00 PM, there is no activity except for immediately preceding and immediately following the timeslot. As a result, this can indicate that the user is less available during this second meeting than during the other two meeting times.

In another embodiment, presence information and/or the presence status of the user/presentity being tracked can be updated, confirmed, or rejected by utilizing multimodal feedback. A user can provide input about their presence through a Graphical User Interface (GUI). However, multimodal feedback can provide a more powerful presence information. For example, a user can record an audio clip and publish it into the system 500. The audio clip can be stored on the presence server 516, the presence archive 506, or on other devices in the system 500. A reference to the recording can be sent to subscribers/watchers as part of the user's presence.

If a limited vocabulary is used, the system 500 could interface with an automatic speech recognition (ASR) engine to recognize the speech and process the input provided by the user. The speech provided by the user can be converted into text and displayed to the user as well. Additionally, presence information can be input in the form of a video clip, photo, or through other forms of media, which can be delivered to subscribers/watchers or others. For example, the presence client can be configured to display a video clip of a user in which the user is shown in a conference room and states that he is available to talk.

Other suitable modifications can be applied to the present disclosure without departing from the scope of the claims below. Accordingly, the reader is directed to the claims section for a fuller understanding of the breadth and scope of the present disclosure.

Figure 10:
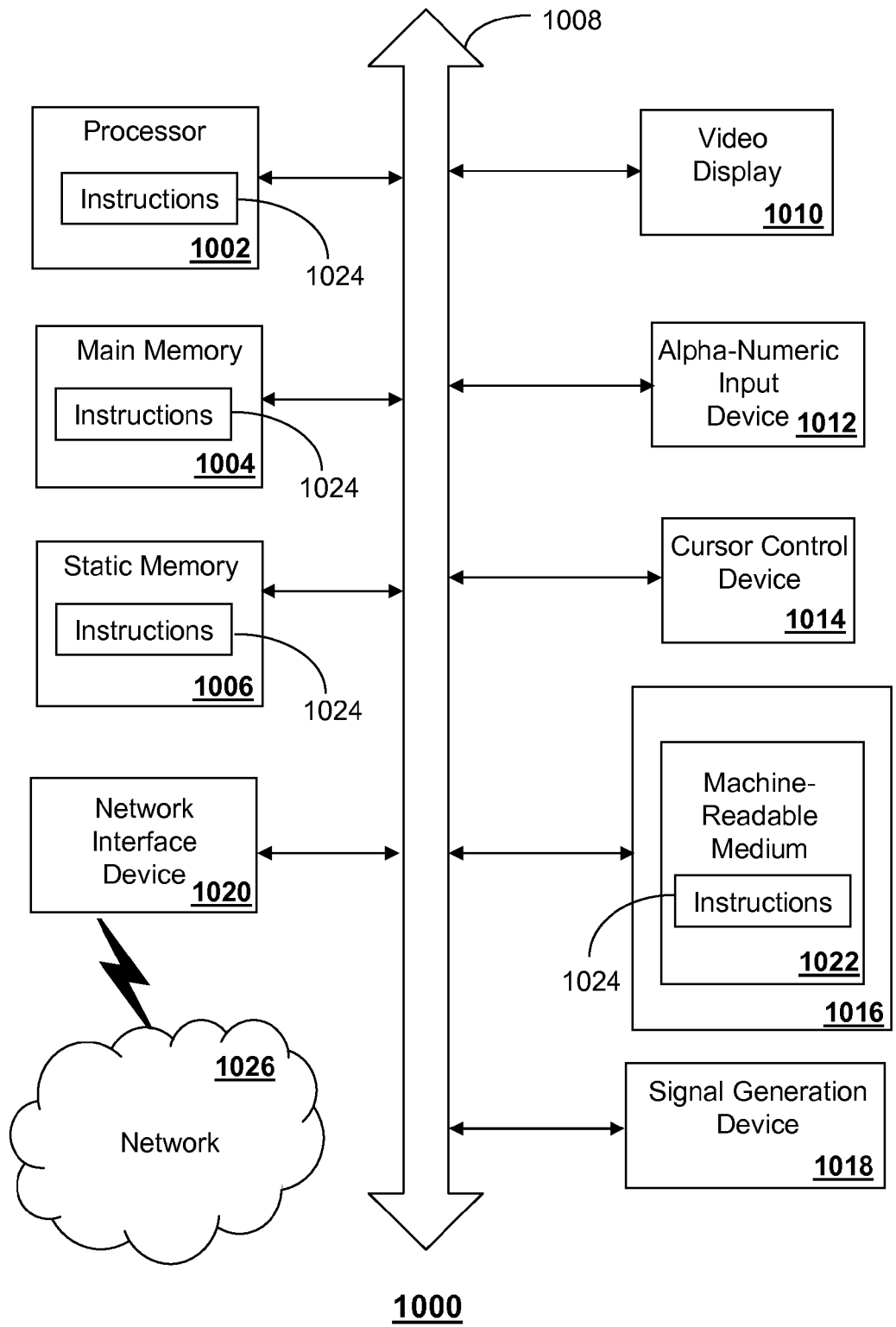
FIG. 10 is a diagrammatic representation of a machine in the form of a computer system within which a set of instructions, when executed, may cause the machine to perform any one or more of the methodologies discussed herein.

FIG. 10 depicts an exemplary diagrammatic representation of a machine in the form of a computer system 1000 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010 (e.g., a liquid crystal display (LCD), a flat panel, a solid state display, or a cathode ray tube (CRT)). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020.

The disk drive unit 1016 may include a machine-readable medium 1022 on which is stored one or more sets of instructions (e.g., software 1024) embodying any one or more of the methodologies or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1024, or that which receives and executes instructions 1024 from a propagated signal so that a device connected to a network environment 1026 can send or receive voice, video or data, and to communicate over the network 1026 using the instructions 1024. The instructions 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server, comprising:
a memory to store computer instructions; and
a controller coupled to the memory, wherein the controller, responsive to executing the computer instructions, performs operations, comprising:
receiving presence information from each presence source of a plurality of presence sources, wherein the presence information is associated with a presence of a user;
receiving, from equipment of a party other than the user, observational feedback related to the presence of the user, wherein the observational feedback comprises user input from the party;
resolving a conflict between the presence information associated with the presence of the user received from each presence source, according to the observational feedback received from the equipment of the party other than the user;
generating modified presence information associated with the presence of the user responsive to the conflict resolution;
determining future presence for the user based on the presence information and the observational feedback received from the equipment of the party other than the user;
receiving a session initiation protocol uniform resource identifier associated with an identification of the user, wherein identification information associated with the user received from each presence source of the plurality of presence sources is mapped to the session initiation protocol uniform resource identifier;
selecting at least a portion of the modified presence information;
determining a presence status of the user based on the selected portion of the modified presence information; and
transmitting the presence status of the user and the session initiation protocol uniform resource identifier to a computing device coupled to an internet protocol multimedia subsystem network.

2. The server of claim 1, wherein the operations further comprise assigning a greater weight to the presence information from a first presence source of the plurality of presence sources than to the presence information from a second presence source of the plurality of presence sources, wherein the equipment of the party other than the user receives a presence status indicator for the user prior to providing the observational feedback related to the presence of the user.

3. The server of claim 2, wherein the operations further comprise adjusting the presence status based on the greater weight assigned to the presence information from the first presence source.

4. The server of claim 1, wherein the presence information comprises information selected from the group consisting of: a login to the computing device; a login to an application; a logout of the computing device; a logout of an application; a stored calendar event; an email transmission; a call record; information pertaining to at least one of the availability and location of the user; available communications means; contact information; media content representing the presence information of the user; other presence information; and combinations thereof.

5. The server of claim 1, wherein the computing device comprises an internet protocol multimedia subsystem gateway.

6. The server of claim 5, wherein the presence server is configured to transmit the presence status of the user to a destination selected from the group consisting of: a second computing device associated with another user subscribing to the presence status of the user; an application configured to monitor the presence status of the user; a device configured to monitor the presence status of the user; and combinations thereof.

7. The server of claim 1, wherein the operations further comprise updating the presence status of the user, resulting in an updated presence status of the user, based on feedback selected from the group consisting of: feedback provided by the user; feedback provided by another user; feedback received in response to a prompt issued by the controller; and combinations thereof.

8. A method, comprising:
   subscribing, by a system including a processor, to presence information associated with a user;
   receiving, by the system, from equipment of a party other than the user, observational presence-related feedback of the user;
   resolving, by the system, responsive to the observational presence-related feedback, a conflict between presence data received from each presence source of a plurality of presence sources tracking the user and the observational presence-related feedback of the user;
   receiving, by the system, a session initiation protocol notification message indicating a presence status of the user from a presence server operating in an internet protocol multimedia subsystem network, wherein the presence status is determined by the system in communication with the presence server, wherein the presence status is determined by the system by selectively aggregating presence data received from each presence source of the plurality of presence sources tracking the user and according to the observational presence-related feedback of the user received from equipment of the party other than the user, wherein identification information associated with the user from each of the plurality of presence sources is mapped to a session initiation protocol uniform resource identifier, and wherein the internet protocol multimedia subsystem network identified the user based on the session initiation protocol uniform resource identifier;
   updating, by the system, the presence status of the user, resulting in an updated presence status of the user, based on the observational presence-related feedback received from equipment of the party other than the user in response to a prompt issued by the system; and
   determining, by the system, future presence for the user based on the presence information and the observational presence-related feedback received from the equipment of the party other than the user.

9. The method of claim 8, comprising receiving, by the system, the updated presence status of the user.

10. The method of claim 8, further comprising assigning by the system a greater weight to the presence data from a first presence source of the plurality of presence sources than to the presence data from a second presence source of the plurality of presence sources.

11. The method of claim 10, further comprising determining, by the system, the presence status based on the greater weight assigned to the presence data from the first presence source.

12. The method of claim 8, comprising receiving, by the system, media content associated with the presence status of the user.

13. The method of claim 8, wherein the presence sources are selected from the group consisting of: an instant messaging clients; mobile devices; personal computers; telephones; email clients; calendars associated with users; networks associated with users; applications configured to convey the presence information; devices configured to convey the presence information; and combinations thereof.

14. A non-transitory computer-readable storage medium, comprising computer instructions, which when executed by a processor, cause the processor to perform operations comprising:
   receiving aggregated presence information associated with a user from a computing device, wherein the aggregated presence information is aggregated by the computing device by selecting presence data from a plurality of presence data received from a plurality of presence sources;
   receiving an identifier from the computing device, wherein the identifier is mapped by the computing device to identification information from each presence source of the plurality of presence sources, wherein the identifier comprises a session initiation protocol uniform resource identifier, and wherein the identification information is associated with the user; and
   receiving, from equipment of a party other the user, presence-related feedback of the user;
   resolving a conflict between the presence information received from each presence source according to the presence-related feedback of the user; and
   wherein the operations further comprise determining future presence for the user based on the presence data and the presence-related feedback received from the equipment of the party other than the user.

15. The non-transitory computer-readable storage medium of claim 14, wherein the operations further comprise:
   receiving additional presence information from a device in the internet protocol multimedia subsystem network; and
   transmitting the additional presence information to the computing device.

16. The non-transitory computer-readable storage medium of claim 14, wherein the identification information comprises an identifier associated with a device of the user and wherein the operations further comprise:
   monitoring call records, email logs and instant message data,
   identifying an attendance pattern based on the monitoring, and
   providing an indicator that the user can be interrupted during an event based on the attendance pattern.

17. The non-transitory computer-readable storage medium of claim 16, wherein the feedback is received in response to a prompt issued by the computing device, wherein the feedback comprises user input at the equipment of the party, and wherein the operations further comprise deleting a calendar entry based on the attendance pattern.

* * * * *